United States Patent [19]
Takami et al.

[11] Patent Number: 5,958,284
[45] Date of Patent: Sep. 28, 1999

[54] FERRITE MAGNET AND METHOD FOR PRODUCING SAME

[75] Inventors: Takashi Takami; Yutaka Kubota; Yasunobu Ogata, all of Saitama-ken, Japan

[73] Assignee: Hitachi Metals, Ltd., Tokyo, Japan

[21] Appl. No.: 08/998,762

[22] Filed: Dec. 29, 1997

[51] Int. Cl.⁶ .............................. C04B 35/40; C04B 35/35
[52] U.S. Cl. .................................. 252/62.63; 252/62.59; 252/62.57
[58] Field of Search ........................... 252/62.63, 62.59, 252/62.57

[56] References Cited

U.S. PATENT DOCUMENTS 4,636,433  1/1987  Kubo et al. ........................ 252/62.59

FOREIGN PATENT DOCUMENTS

| | | |
|---|---|---|
| 0 758 786 | 2/1997 | European Pat. Off. . |
| 758786 | 2/1997 | European Pat. Off. . |
| 62-252325 | 11/1987 | Japan . |
| 9-115715 | 5/1997 | Japan . |
| WO 98/38654 | 9/1998 | WIPO . |

*Primary Examiner*—C. Melissa Koslow
*Attorney, Agent, or Firm*—Sughrue, Mion, Zinn, Macpeak & Seas, PLLC

[57] ABSTRACT

The ferrite magnet having a composition represented by the general formula: $(A_{1-x}R_x)O \cdot n[(Fe_{1-y}M_y)_2O_3]$ (by atomic ratio), wherein A is Sr and/or Ba, R is at least one element selected from the group consisting of La, Nd, Pr, Sm, Eu and Gd, La being indispensable, M is at least one element selected from the group consisting of Mn, Co and Ni, and x, y and n meet $0.05 \leq x \leq 0.5$, $x/(2.4n) \leq y \leq x/(1.6n)$ and $5.4 \leq n \leq 6.0$, respectively is produced by preparing a starting material powder having the above composition and an average particle size of 0.4–0.7 μm, and subjecting the starting material powder to molding in a magnetic field and then to sintering.

10 Claims, 5 Drawing Sheets

FERRITE MAGNET AND METHOD FOR PRODUCING SAME

BACKGROUND OF THE INVENTION

The present invention relates to a ferrite magnet having high saturation magnetization as and coercive force iHc extremely useful for wide varieties of magnet applications, and a method for producing same.

Ferrite magnets are used for various applications including rotors of motors, generators, etc., and particularly ferrite magnets with higher magnetic properties are recently demanded for the purpose of miniaturization and reduction in weight in the field of rotors for automobiles and for the purpose of increasing efficiency in the field of rotors for electric appliance.

High-performance sintered magnets such as Sr ferrite or Ba ferrite have conventionally been produced by the following methods. First, iron oxide is mixed with carbonate of Sr or Ba and calcined to complete a ferrite-forming reaction. After clinker formed by calcination is coarse-pulverized, $SiO_2$, $SrCO_3$ or $CaCO_3$ is added to control sintering behavior, and $Al_2O_3$ or $Cr_2O_3$ is added to control coercive force iHc. Coarse particles with additives are then subjected to fine pulverization to an average particle size of 0.7–1.0 $\mu$m. The resultant fine powder slurry is wet-molded in a magnetic field while orienting ferrite powder, to form a green body. The green body is then sintered and worked to final product shape.

In such a conventional production method, there are the following five methods conceivable to increase the performance of ferrite magnets.

The first method is to finely pulverize the ferrite magnet. Since it shows higher coercive force iHc as the size of the crystal grains in the sintered body becomes nearer about 0.9 $\mu$m, which is a critical single magnetic domain size of the magnetoplumbite-type Sr ferrite magnet, fine pulverization is carried out to an average particle size of 0.7 $\mu$m or less, for instance, taking into consideration grain growth during the sintering process. This method, however, is disadvantageous in that productivity decreases as the fine pulverization proceeds because the fine pulverization lowers water-removal characteristics in the wet molding.

The second method is to make the crystal grain size of the sintered body as uniform as possible. Ideally, the crystal grain size is made as uniformly close to the above critical single magnetic domain size (about 0.9 $\mu$m) as possible. Crystal grains larger than this size contribute to decrease in the coercive force iHc. The specific means for achieving high performance in this method is to improve a particle size distribution of fine powder, but the improvement is naturally limited because known pulverizers such as ball mills, attritors, etc. are used in a commercial production. Recently, attempts have been made to produce fine ferrite powder having a more uniform particle size by a chemical precipitation method, but such methods are not suitable for commercial mass-production.

The third method is to increase the orientation of the crystal grains which affects magnetic anisotropy. The specific means in this method is to add a surfactant to a slurry of fine ferrite powder to improve the dispersion of ferrite particles in the slurry, or to increase the intensity of the magnetic field in the process of orientation.

The fourth method is to increase the density of the sintered body. Though the Sr ferrite has a theoretical density of 5.15 $g/cm^3$, Sr ferrite magnets now commercially available have a density of about 4.9–5.0 $g/cm^3$, 95–97% of the theoretical density. Improvement in the residual magnetic flux density Br is expected by increasing the density of the ferrite sintered body, special density-increasing methods such as HIP, etc. are needed to achieve as high density as exceeding the above range. Such special processes, however, lead to high production cost, depriving the ferrite magnets of advantages as inexpensive magnets.

The fifth method is to improve the saturation magnetization σs or crystal magnetization anisotropy constant of the ferrite compound per se which is a main component of the ferrite magnet. Improvement in the saturation magnetization σs is likely to directly lead to improvement in the residual magnetic flux density Br. Also, improvement in the crystal magnetization anisotropy constant is likely to directly lead to improvement in the coercive force iHc. Ferrite compounds which have conventionally been produced have a crystal structure of magnetoplumbite (M type). Though investigation has been conducted on W-type ferrite having larger saturation magnetization than that of the M-type ferrite, the W-type ferrite has not been mass-produced because it is difficult to control the sintering atmosphere.

Under such circumstances, higher performance of the ferrite magnets is now sought by the first to fourth methods. However, it is difficult to seek extremely higher performance in ferrite magnets mainly composed of compounds expressed by $SrO \cdot nFe_2O_3$, by the first to fourth methods. The first reason therefor is that the first to fourth methods include conditions which may hinder high productivity or steps which are difficult to be put into a mass-production. The second reason therefor is that the $SrO \cdot nFe_2O_3$ ferrite magnet has magnetic properties, particularly residual magnetic flux density Br, which are already close to the theoretical levels.

OBJECT AND SUMMARY OF THE INVENTION

An object of the present invention, therefore, is to provide a ferrite magnet with remarkably improved magnetic properties by the above fifth method.

Another object of the present invention is to provide a method for producing the above ferrite magnet.

As a result of research in view of the above objects, the inventors have paid attention to the fact that the addition of particular metal oxides to a ferrite magnet expressed by $AO \cdot nFe_2O_3$, wherein A is Sr and/or Ba, to substitute part of A and Fe with the added metal elements leads to improvement in magnetic properties thereof.

The magnetic properties of the magnetoplumbite-type ferrite magnet are determined by the magnetic moment of Fe ion, and the magnetoplumbite-type ferrite magnet has a ferrimagnetic structure in which the parallel magnetic moments are arranged partially in opposite directions. In this magnetic structure, there are two methods to improve the saturation magnetization. The first method is to replace Fe ions at sites corresponding to the opposite parallel magnetic moments with different elements having smaller magnetic moments than those of Fe ion or with non-magnetic elements. The second method is to replace Fe ions at sites corresponding to the parallel magnetic moments with different elements having larger magnetic moments than those of Fe ion.

Increase in the crystal magnetization anisotropy constant in the above magnetic structure can be achieved by the replacement of Fe ions with different elements having stronger interaction with the crystal lattice. Specifically, Fe ions are replaced by elements having residual magnetic moments derived from orbital angular movement or larger elements.

Keeping the above finding in mind, the inventors have made detailed investigation about the replacement of Fe ions with various metal elements by adding various metal oxides. As a result, the inventors have found that Mn, Co, Ni and Zn are elements remarkably improving the magnetic properties of the ferrite magnets. However, the mere addition of these elements fails to provide sufficient effects, because the replacement of Fe ions with different elements destroys the balance in ion valency, resulting in the formation of undesirable phases. To avoid this phenomenon, Sr or Ba sites are replaced by different elements for the purpose of charge compensation. For this purpose, La, Nd, Pr, etc. may be used, and it has been found that La is particularly effective. The present invention is based on such finding.

The first ferrite magnet according to the present invention has a composition represented by the general formula (1):

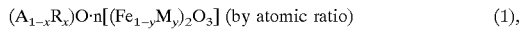
$(A_{1-x}R_x)O \cdot n[(Fe_{1-y}M_y)_2O_3]$ (by atomic ratio)      (1), wherein A is Sr and/or Ba, R is at least one element selected from the group consisting of La, Nd, Pr, Sm, Eu and Gd, La being indispensable, M is at least one element selected from the group consisting of Mn, Co and Ni, and x, y and n meet $0.05 \leq x \leq 0.5$, $x/(2.4n) \leq y \leq x/(1.6n)$ and $5.4 \leq n \leq 6.0$, respectively.

The second ferrite magnet according to the present invention has a composition represented by the general formula (2):

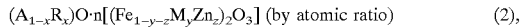
$(A_{1-x}R_x)O \cdot n[(Fe_{1-y-z}M_yZn_z)_2O_3]$ (by atomic ratio)      (2), wherein A is Sr and/or Ba, R is at least one element selected from the group consisting of La, Nd, Pr, Sm, Eu and Gd, La being indispensable, M is at least one element selected from the group consisting of Mn, Co and Ni, Co being indispensable, and x, y, z and n meet $0.05 \leq x \leq 0.5$, $x/(2.4n) \leq (y+z) \leq x/(1.6n)$ and $5.4 \leq n \leq 6.0$, respectively.

The method for producing a ferrite magnet according to the present invention comprises the steps of preparing a starting material powder having the above composition (1) or (2) and an average particle size of 0.4–0.7 μm, and subjecting the starting material powder to molding in a magnetic field and then to sintering.

DETAILED DESCRIPTION OF THE PREFERRED EMBODIMENTS

Figure 1:
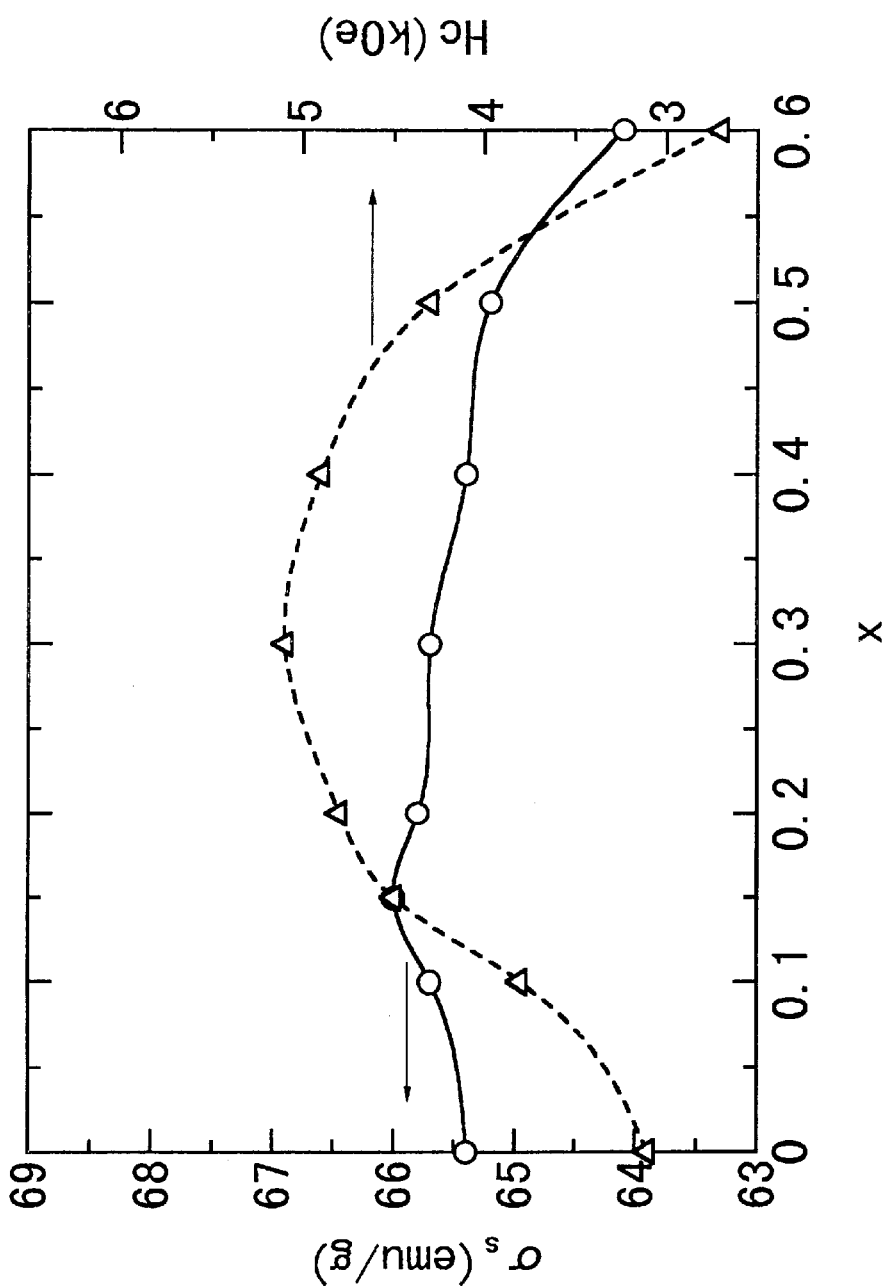
FIG. 1 is a graph showing the relations between the amount x of La added and saturation magnetization σs and coercive force Hc in Example 2.

[1] Basic composition of first ferrite magnet

The first ferrite magnet has a basic composition represented by the general formula (1):

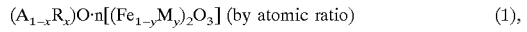
$(A_{1-x}R_x)O \cdot n[(Fe_{1-y}M_y)_2O_3]$ (by atomic ratio)      (1), wherein A is Sr and/or Ba, R is at least one element selected from the group consisting of La, Nd, Pr, Sm, Eu and Gd, La being indispensable, M is at least one element selected from the group consisting of Mn, Co and Ni, and x, y and n meet $0.05 \leq x \leq 0.5$, $x/(2.4n) \leq y \leq x/(1.6n)$ and $5.4 \leq n \leq 6.0$, respectively.

(1) R element

La is an indispensable element, and La may not only be added alone, but also a combination thereof with other elements such as La+Pr, La+Nd, etc. may be added. To achieve high saturation magnetization, the percentage of La in R is preferably 50 atomic % or more, more preferably 70 atomic % or more. It is most preferable to add La substantially alone.

The amount x of the R element added should meet the formula $0.05 \leq x23\ 0.5$ by atomic ratio. When the amount x of the R element is less than 0.05, sufficient effects of improving coercive force and saturation magnetization cannot be achieved. On the other hand, when the amount x of the R element exceeds 0.5, the above effects rather decrease. The preferred amount x of the R element is 0.07–0.4 by atomic ratio.

(2) M element

The M element may be any one of Mn, Co and Ni, and Co is preferable to achieve a higher coercive force. Also, when two or more M elements such as Mn+Co and Ni+Co are added, higher-performance magnets can be obtained. In this case, the percentage of Co in the M elements is preferably 50 atomic % or more.

The amount y of the M element added should meet the conditions: $x/(2.4n) \leq y \leq x/(1.6n)$. Though it is ideal for the purpose of charge compensation that the relation of $y=x/(2.0n)$, namely $x/ny=2.0$ is satisfied, the effects of the present invention can be achieved without substantial deterioration of magnetic properties if x/ny is within the range of 1.6–2.4. On the other hand, when x/ny exceeds 2.4 or is less than 1.6, extreme deterioration of magnetic properties is appreciated. Incidentally, when y deviates from the value of x/(2.0n), the ferrite magnet may contain $Fe^{2+}$, which does not pose any trouble.

To achieve excellent magnetic properties, the percentage of $[(Fe_{1-y}M_y)_2O_3]$ to $(A_{1-x}R_x)O$ by atomic ratio should be within the range of 5.4–6.0. When n exceeds 6.0, other phases such as $\alpha$-$Fe_2O_3$ than a magnetoplumbite phase are formed, resulting in decrease in magnetic properties. Also, when n is less than 5.4, sufficient residual magnetic flux density cannot be obtained.

[2] Basic composition of first ferrite magnet

The second ferrite magnet has a basic composition represented by the general formula (2):

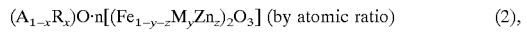
$(A_{1-x}R_x)O \cdot n[(Fe_{1-y-z}M_yZn_z)_2O_3]$ (by atomic ratio)      (2), wherein A is Sr and/or Ba, R is at least one element selected from the group consisting of La, Nd, Pr, Sm, Eu and Gd, La being indispensable, M is at least one element selected from the group consisting of Mn, Co and Ni, Co being indispensable, and x, y, z and n meet $0.05 \leq x \leq 0.5$, $x/(2.4n)$ $\leq(y+z)\leq x/(1.6n)$ and $5.4\leq n\leq 6.0$, respectively. Except that (i) Zn is an indispensable element, and that (ii) the M element includes Co as an indispensable element, the second ferrite magnet has the same basic composition as that of the first ferrite magnet.

In the second ferrite magnet, Co and Zn are indispensable, and the addition of two or more elements such as Mn+Co+Zn, Ni+Co+Zn, Zn+Co, etc. can lead to higher-performance magnetic materials.

When emphasis is placed on the coercive force, the content of Co in (M+Zn) is preferably 50 atomic % or more, more preferably 70 atomic % or more. Accordingly, y/z is preferably 1 or more, more preferably 2.3 or more.

Though it is ideal for the purpose of charge compensation that the relation of $(y+z)=x/(2.0n)$ is satisfied, there is no substantial deterioration of magnetic properties if (y+z) is within the range of $x/(2.4n)-x/(1.6n)$. On the other hand, when $x/[n(y+z)]$ exceeds 2.4 or is less than 1.6, extreme deterioration of magnetic properties is appreciated. Incidentally, when (y+z) deviates from the value of $x/(2.0n)$, the ferrite magnet may contain $Fe^{2+}$, which does not pose any trouble.

With respect to the R element and the atomic ratio n of $[(Fe_{1-y-z}M_yZn_z)_2O_3]$ to $(A_{1-x}R_x)O$, the second ferrite magnet is the same as the first ferrite magnet. Namely, the content x (atomic ratio) of the R element is 0.05–0.5, and n is 5.4–6.0.

[3] Other additives

To obtain the high-performance ferrite sintered body, it is preferable to add $SiO_2$ and/or CaO ($CaCO_3$) as a sintering-controlling component (sintering aid).

$SiO_2$ is an additive for suppressing the growth of crystal grains during the sintering, and the amount of $SiO_2$ added is properly 0.2–0.5 weight %. When the amount of $SiO_2$ added is less than 0.2 weight %, excess growth of crystal grains occurs during the sintering, resulting in decrease in the coercive force. On the other hand, when it exceeds 0.5 weight %, the growth of crystal grains is excessively suppressed, resulting in insufficient improvement in the orientation of crystal grains which proceeds as the crystal grains grow, thus providing the resultant ferrite magnet with poor residual magnetic flux density.

CaO ($CaCO_3$) is a component for accelerating crystal grain growth, and the amount of CaO ($CaCO_3$) added is properly 0.35–0.55 weight %. When the amount of CaO ($CaCO_3$) added exceeds 0.55 weight %, excess growth of crystal grains occurs during the sintering, resulting in decrease in the coercive force. On the other hand, when it is less than 0.35 weight %, the growth of crystal grains is excessively suppressed, resulting in insufficient improvement in the orientation of crystal grains which proceeds as the crystal grains grow, thus providing the resultant ferrite magnet with poor residual magnetic flux density.

[4] Production method

The method for producing the above ferrite magnet comprises the steps of preparing a starting material powder having the first or second composition, and subjecting the starting material powder to molding in a magnetic field and then to sintering. The pulverization is preferably carried out by a coarse pulverization step and a fine pulverization step, and the sintering is preferably carried out by a calcination step and a sintering step.

(1) Preparation of starting material powder $Fe_2O_3$ may be mixed with one or more oxides of the A elements, one or more oxides of the R elements, one or more oxides of the M elements and ZnO, etc. in a wet manner. When the R elements and the M elements are added at the step of mixing, they experience two high-temperature steps of calcination and sintering, so that solid diffusion proceeds, providing the ferrite magnet with more uniform composition. The mixing medium may be water, alcohol, etc.

(2) Calcination and coarse pulverization of starting material powder

The starting material powder is calcined at 1150–1250° C. to provide the starting material with a uniform composition, which is then coarse-pulverized. The coarse pulverization may be carried out by a dry method or by a wet method.

(3) Addition of sintering aid

Before or after the calcination, or before or after the coarse pulverization, it is preferable to add $SiO_2$ and/or CaO ($CaCO_3$) as a sintering aid. The amount of $SiO_2$ added is properly 0.2–0.5 weight %, and the amount of CaO added is properly 0.35–0.55 weight %. When $CaCO_3$ is added, the amount of CaO converted from the amount of $CaCO_3$ should be 0.35–0.55 weight %.

(4) Fine pulverization

A mixture of the starting material having the basic composition and the sintering aids is finely pulverized. The medium for fine pulverization is preferably water, alcohol, etc. The fine pulverization is carried out until the average particle size becomes 0.4–0.7 μm. When the fine pulverization is carried out until the average particle size becomes less than 0.4 μm, irregular growth of crystal grains takes place during the sintering, resulting in decrease in the coercive force and the deterioration of water-removal characteristics in the wet molding process. On the other hand, when the pulverization is finished before the average particle size reaches 0.7 μm, the resultant ferrite sintered body contains a high percentage of coarse crystal grains in the structure thereof.

(5) Molding

After fine pulverization by a wet method, a slurry containing the ferrite powder is condensed or dried to provide a higher-concentration slurry. A dispersant is then added to the slurry and mixed well to impart a shearing force to the ferrite powder, thereby breaking the aggregation of the ferrite powder and increasing the orientation thereof. Thus, the resultant ferrite magnet has improved magnetic properties. Because of the modification of ferrite powder surface due to the adsorption of the dispersant, the ferrite powder is well dispersed, providing the resultant ferrite magnet with improved magnetic properties.

Known as dispersants are surfactants, higher aliphatic acids, higher aliphatic acid soaps, higher aliphatic esters, etc., and the use of polycarboxylic acid dispersant, one of anionic surfactants, improves the dispersibility of the ferrite particles, effectively preventing the aggregation of the ferrite particles. Among the polycarboxylic acid dispersants, ammonium polycarboxylate is particularly effective to improve the dispersibility of the ferrite particles.

The amount of the dispersant added is preferably 0.2–2.0 weight % on a solid basis. When the amount of the dispersant added is less than 0.2 weight %, sufficient dispersing effects cannot be achieved. On the other hand, when it exceeds 2 weight %, the resultant ferrite magnet has rather decreased residual magnetic flux density.

The molding of fine ferrite powder is carried out in a magnetic field. In the case of a wet molding, the magnetic field applied is preferably about 5–20 kOe.

(6) Sintering

After drying in the case of the wet molding, the green body is sintered at 1150–1250° C.

The present invention will be explained in further detail by way of the following Examples without intention of restricting the scope of the present invention thereto.

Example 1

$SrCO_3$, $Fe_2O_3$, an oxide of the R element and oxides of the M elements were formulated in such proportions as to provide the chemical formula: $(Sr_{1-x}R_x)O \cdot n[(Fe_{1-y}M_y)_2O_3]$, wherein n=6.0, x=0.15 and y=x/2n, wet-mixed, and then calcined at 1200° C. for 2 in the air.

La was selected as the R element based on the fact that La had an ion radius close to that of Sr, and Ti, V, Mn, Co, Ni, Cu and Zn were selected as the M elements based on the fact that they had ion radii close to that of Fe. Also, a starting material having the above composition in which n=6.0, x=0, and y=0 was also calcined as a comparative material in the same manner as above.

Each calcined powder was coarse-pulverized in a dry state by a roller mill, and the resultant coarse powder was measured with respect to magnetic properties by a vibration magnetometer. The maximum intensity of a magnetic field in which the measurement was carried out was 12 kOe, and the saturation magnetization σs was determined by plotting $\sigma-1/H^2$. Also, formed phases were identified by X-ray diffraction. The measurement results are shown in Table 1.

TABLE 1

| Sample No. | R | M | σs (emu/g) | Hc (kOe) | Formed Phases[1] |
|---|---|---|---|---|---|
| 1[2] | La | 100-at. % Ti | 64.6 | 3.1 | M Phase |
| 2[2] | La | 50-at. % Ti + 50-at. % Co | 62.1 | 0.8 | M Phase |
| 3[2] | La | 100-at. % V | 59.0 | 6.4 | M Phase |
| 4[2] | La | 50-at. % V + 50-at. % Co | 59.1 | 6.4 | M Phase |
| 5 | La | 100-at. % Mn | 67.1 | 3.7 | M Phase |
| 6 | La | 50-at. % Mn + 50-at. % Co | 66.8 | 3.9 | M Phase |
| 7 | La | 100-at. % Co | 66.0 | 4.5 | M Phase |
| 8 | La | 100-at. % Ni | 66.1 | 2.9 | M Phase |
| 9 | La | 50-at. % Ni + 50-at. % Co | 65.9 | 3.5 | M Phase |
| 10[2] | La | 100-at. % Cu | 65.8 | 0.3 | M Phase + Different Phase |
| 11[2] | La | 50-at. % Cu + 50-at. % Co | 65.1 | 1.2 | M Phase + Different Phase |
| 12 | La | 100-at. % Zn | 68.9 | 3.1 | M Phase |
| 13 | La | 50-at. % Zn + 50-at. % Co | 67.8 | 3.6 | M Phase |
| 14[2] | — | — | 65.4 | 3.1 | M Phase |

Note:
[1]Magnetoplumbite phase.
[2]Outside the scope of the present invention.

It is clear from Table 1 that when La is selected as the R element, and when Mn, Co, Ni and Zn are selected as the M elements, it is possible to obtain magnet powder with higher saturation magnetization and/or coercive force as compared with Comparative Example (Sample No. 14), which can be formed into bulk sintered magnets having higher performance than that of Comparative Example. It has also been found that when the M element is used as a combination of Co+ other elements such as Mn+Co, Ni+Co and Zn+Co, higher-performance magnet materials can be obtained.

Example 2

Sr was selected as the A element, La was selected as the R element, and Co was selected as the M element. Accordingly, $SrCO_3$, $Fe_2O_3$, $La_2O_3$, and CoO were formulated in such proportions as to provide the chemical formula: $(Sr_{1-x}La_x)O \cdot n[(Fe_{1-y}Co_y)_2O_3]$, wherein n=6.0, x=0–0.6 and y=x/2n, wet-mixed, and then calcined at 1200° C. for 2 hours in the air. Next, coarse powder was prepared in the same manner as in Example 1 to measure magnetic properties thereof. The results are shown in FIG. 1.

It is clear from FIG. 1 that by adding both $La_2O_3$ and CoO, the coercive force is remarkably improved with the saturation magnetization substantially kept or suffering from no extreme decrease. Also, when the amount x of La was 0.05 or more, the effects of adding these components were remarkable. Therefore, the amount x of La is 0.05–0.5, preferably 0.07–0.4.

When the R elements were La+Pr or La+Nd, and when the M elements were Co+Zn, Co+Mn or Co+Ni, the same tendency as in FIG. 1 was appreciated. When n is within the range of 5.4–6.0, there is no significant difference appreciated among samples, confirming the same effects.

Example 3

To investigate the permissible range of a ratio (x/y) of the R element/the M element in connection with the charge compensation, Sr was selected as the A element, La was selected as the R element, and Co was selected as the M element. $SrCO_3$, $Fe_2O_3$, $La_2O_3$ and CoO were formulated in such proportions as to provide the chemical formula: $(Sr_{1-x}La_x)O \cdot n[(Fe_{1-y}Co_y)_2O_3]$, wherein n=6.0, x=0.15 and $y=0.77 \times 10^{-2}–1.43 \times 10^{-2}$, wet-mixed, and then calcined at 1200° C. for 2 hours in the air. Next, coarse powder was prepared in the same manner as in Example 1 to measure magnetic properties thereof.

As a result, not only at a ratio at which the conditions of completely satisfying the charge balance, namely the formula of y=x/2n, were satisfied, but also in a range in which x/ny was within the range of 1.6–2.4, substantial deterioration of the magnetic properties was not observed, keeping the effects of the present invention. On the other hand, when x/ny exceeded 2.4 or was less than 1.6, remarkable deterioration of the magnetic properties was observed.

Example 4

Sr was selected as the A element, La was selected as the R element, and Zn was selected as the M element. Accordingly, $SrCO_3$, $Fe_2O_3$, $La_2O_3$ and ZnO were formulated in such proportions as to provide the chemical formula: $(Sr_{1-x}La_x)O \cdot n[(Fe_{1-y}Zn_y)_2O_3]$, wherein n=5.85, x=0.117 and y=x/2n, wet-mixed, and then calcined at 1200° C. for 2 hours in the air. Calcined powder was coarse-pulverized in a dry state by a roller mill and then wet-pulverized by an attritor to form a slurry containing fine powder having an average particle size of 0.7 ∥m. To investigate the influence of the sintering aid on the magnetic properties, $SiO_2$ and $CaCO_3$ were added to the ferrite magnet powder at the early stage of pulverization in amounts of 0–0.6 weight % and 0.8 weight % (0.45 weight % when converted to CaO), respectively, per the ferrite magnet powder.

Figure 2:
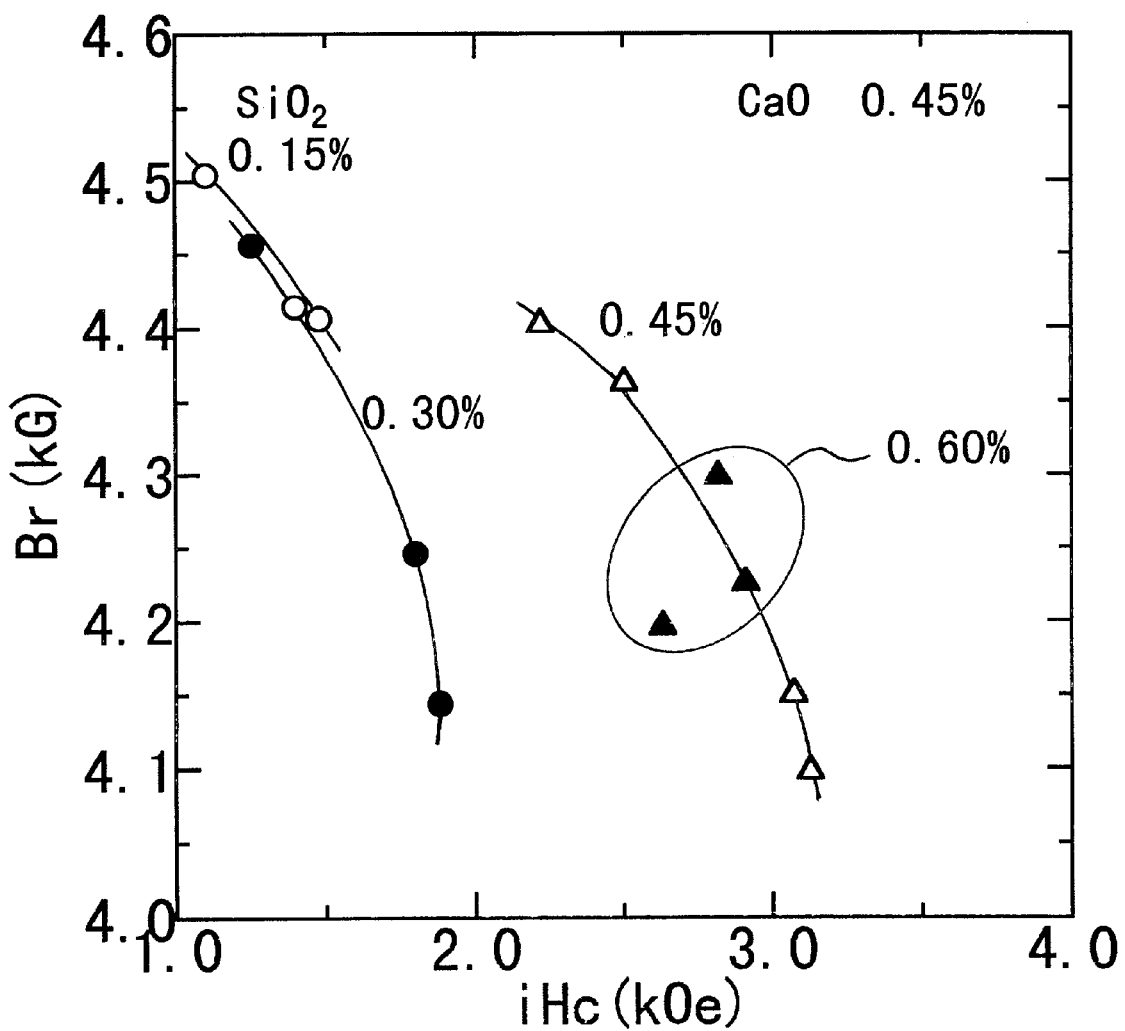
FIG. 2 is a graph showing the relations between the amounts of $SiO_2$ and CaO added and residual magnetic flux density Br and coercive force iHc in Example 4.

The resultant slurry was wet-molded in a magnetic field of 10 kOe. The resultant green body was sintered in a temperature range of 1180–1230° C. for 2 hours. The resultant sintered body was worked to a shape of about 10 mm×10 mm×20 mm to measure magnetic properties thereof by a B-H tracer. The results are shown in FIG. 2. Incidentally, when $SiO_2$ was 0 weight %, no plot was added to FIG. 2 because the iHc was extremely low.

It is clear from FIG. 2 that as the amount of $SiO_2$ increased, the coercive force iHc increased, reaching a proper iHc level at 0.45 weight % of $SiO_2$. When the amount of $SiO_2$ was further increased to 0.6 weight %, the dependency of iHc on the sintering temperature became unusable. This seems to be due to the fact that $SiO_2$ excessively functioned to suppress the growth of crystal grains, hindering proper crystal grain growth during the sintering. Accordingly, the amount of $SiO_2$ added is preferably within the range of 0.4–0.5 weight %.

The above are the results when n=5.85, but it should be noted that the preferred range of $SiO_2$ added depends on the value of n. Thus, as a result of the same investigation at n=5.95, it has been found that the amount of $SiO_2$ added is preferably 0.2–0.5 weight %.

As a result of investigating the dependency of the magnetic properties on the amount of CaO added with the amount of $SiO_2$ fixed to 0.45 weight %, it has been found that the preferred amount of CaO added is 0.35–0.55 weight %.

Next, with respect to a sintered body prepared in the same manner as in Example 4 except for replacing Zn with Co as the M element, the influence of the addition of both $SiO_2$ and CaO on the magnetic properties of the resultant sintered body was observed. As a result, it has been found that the amount of $SiO_2$ is preferably 0.2–0.5 weight %, and that the amount of CaO is preferably 0.35–0.55 weight %.

Example 5

La was selected as the R element, and Mn, Co, Ni and Zn were selected as the M elements. Accordingly, $SrCO_3$, $Fe_2O_3$, $La_2O_3$, and oxides of the M elements were formulated in such proportions as to provide the chemical formula: $(Sr_{1-x}La_x)O \cdot n[(Fe_{1-y}M_y)_2O_3]$, wherein n=5.85, x=0.117 and y=x/2n, wet-mixed, and then calcined at 1200° C. for 2 hours in the air. Calcined powder was coarse-pulverized in a dry state by a roller mill and then wet-pulverized by an attritor to form a slurry containing fine powder having an average particle size of 0.7 μm. $SiO_2$ and $CaCO_3$ were added as sintering aids to the ferrite magnet powder at the early stage of pulverization in amounts of 0.45 weight % and 0.8 weight % (0.45 weight % when converted to CaO), respectively, per the ferrite magnet powder.

The resultant slurry was wet-molded in a magnetic field of 10 kOe, and the resultant green body was sintered in a temperature range of 1180–1230° C. for 2 hours. Samples having the above compositions in which x=0 and y=0 were also prepared as comparative materials in the same manner as above. Each sintered body was worked to a shape of about 10 mm×10 mm×20 mm to measure magnetic properties thereof by a B-H tracer. The results are shown in FIG. 3.

Figure 3:
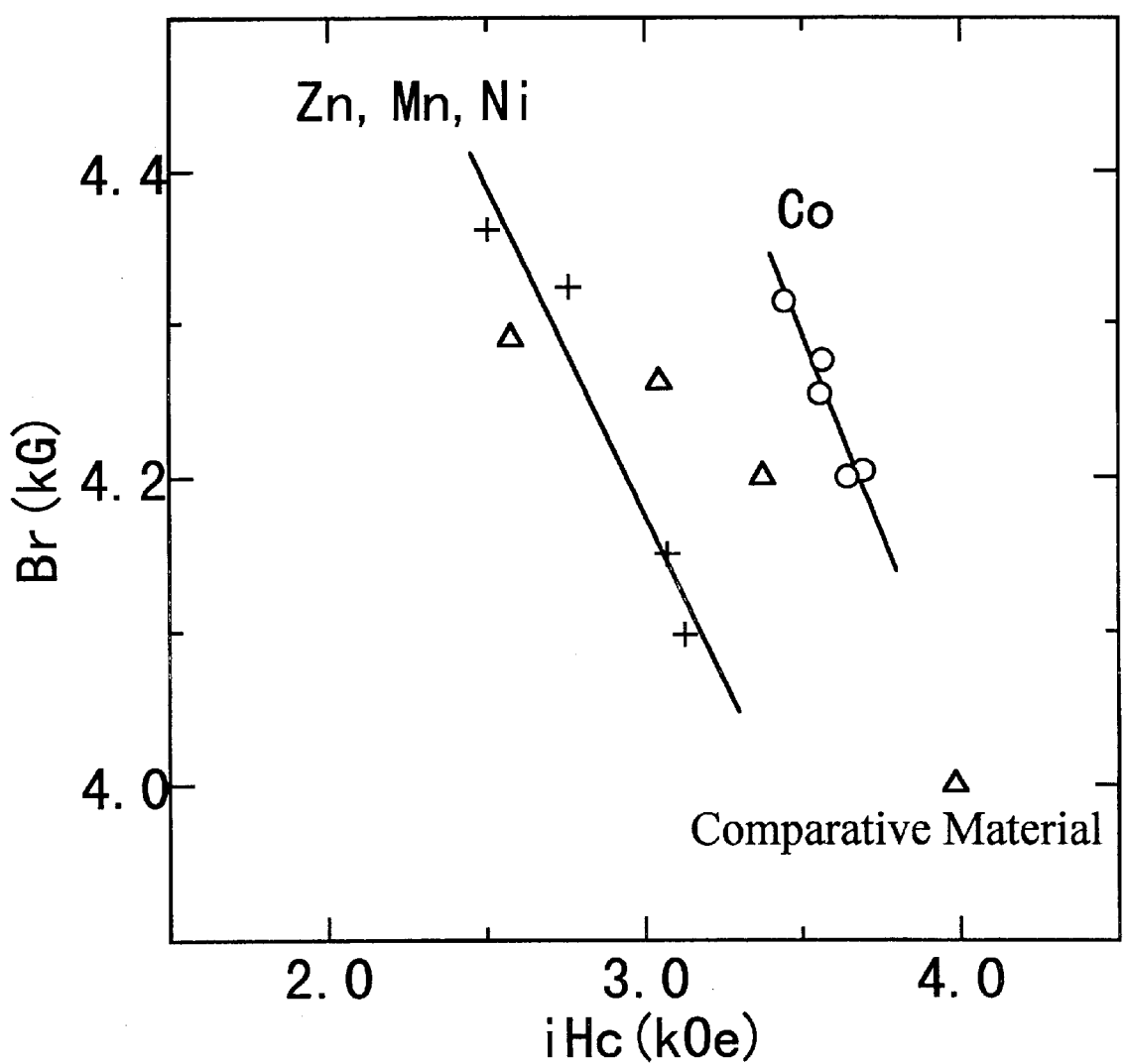
FIG. 3 is a graph showing the relations between the amount of an M element added and residual magnetic flux density Br and coercive force iHc in Example 5.

It is clear from FIG. 3 that when Mn, Ni or Zn was added, the residual magnetic flux density Br well increased at a low iHc region as compared with those containing no M elements, thus providing remarkable increase in saturation magnetization σs. Accordingly, Mn, Ni or Zn is suitable to obtain high-Br ferrite magnets.

The ferrite magnets containing Co as the M element are extremely promising as high-performance materials, because they have both relatively good Br and high iHc. It is clear from this Example that the ferrite magnet materials of the present invention are superior to the comparative materials.

Incidentally, with respect to sintered bodies prepared in the same manner as in Example 5 except for replacing $SrCO_3$ with $BaCO_3$ (selecting Ba as the A element) in the formulation before calcination, the same effects are expected.

Example 6

La was selected as the R element, and Co was selected as the M elements. Accordingly, $SrCO_3$, $Fe_2O_3$, $La_2O_3$, and $Co_3O_4$ were formulated in such proportions as to provide the chemical formula:

$(Sr_{1-x}La_x)O \cdot n[(Fe_{1-y}Co_y)_2O_3]$, wherein n=5.85, x=0.3 and y=x/2n, wet-mixed, and then calcined at 1200° C. for 2 hours in the air. Calcined powder was coarse-pulverized in a dry state by a roller mill and then wet-pulverized by an attritor to form a slurry containing fine powder having an average particle size of 0.73 μm. Also, a slurry containing fine powder having an average particle size of 0.43 μm was prepared by a sand mill. $SiO_2$ and $CaCO_3$ were added as sintering aids to the ferrite magnet powder at the early stage of pulverization in amounts of 0.45 weight % and 0.8 weight % (0.45 weight % when converted to CaO), respectively, per the ferrite magnet powder.

The slurry containing fine powder having an average particle size of 0.73 μm was directly wet-molded in a magnetic field of 10 kOe, while the slurry containing fine powder having an average particle size of 0.43 μm was dried and then blended. The blending of the slurry was carried out by a kneader after adding water such that the solid concentration became 85 weight %. To increase the dispersibility of the fine powder, 0.4 weight % of polycarboxylate was added on a solid basis. Next, molding was carried out in the same manner as in the fine powder having an average particle size of 0.73 μm.

Each green body was sintered in a temperature range of 1180–1230° C. for 2 hours. Samples having the above compositions in which x=0 and y=0 were also prepared as comparative materials in the same manner as above. Each sintered body was worked to a shape of about 10 mm×10 mm×20 mm to measure magnetic properties thereof by a B-H tracer. The results are shown in FIG. 4.

Figure 4:
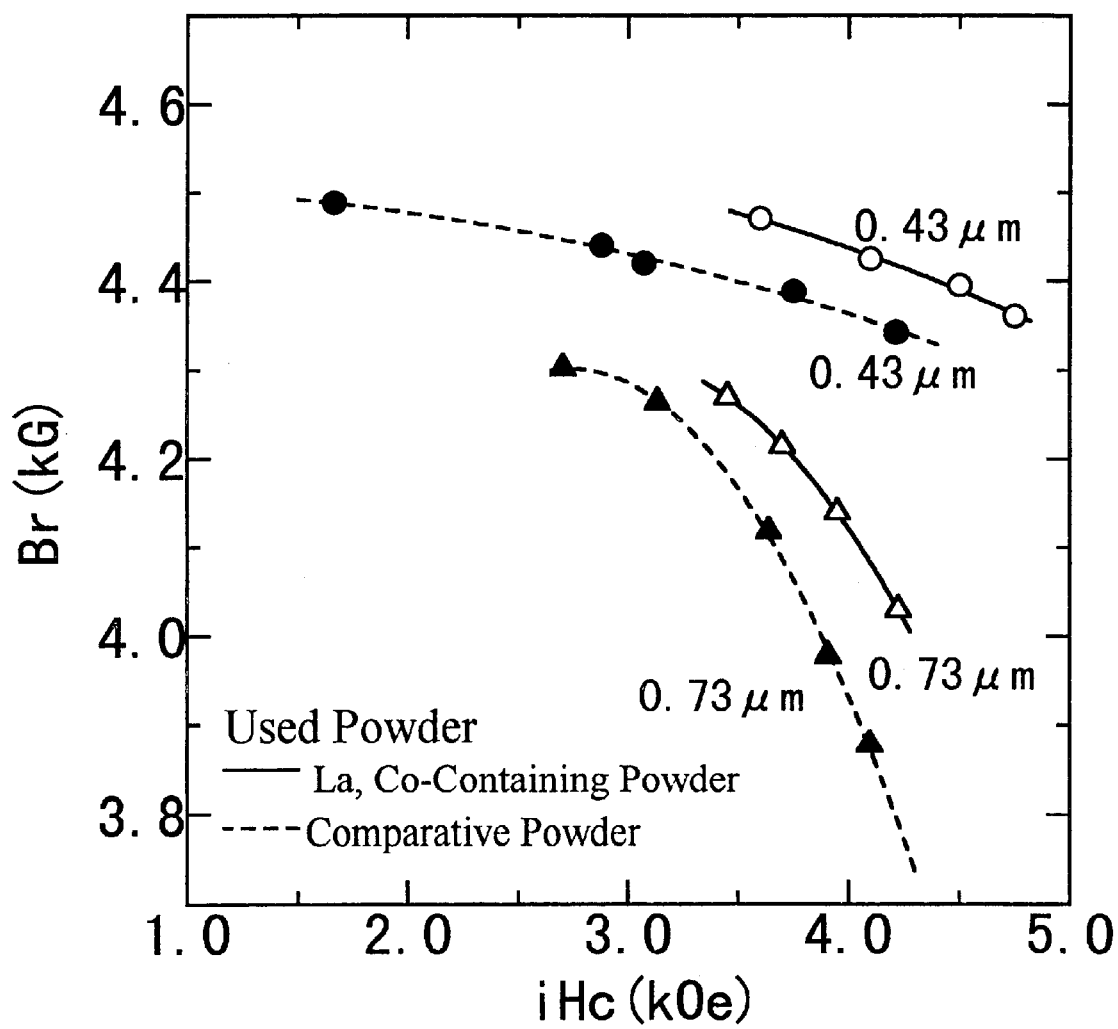
FIG. 4 is a graph showing the influence of the presence of La and Co on residual magnetic flux density Br and coercive force iHc with respect to ferrite magnet powders having an average particle size of 0.73 μm and 0.43 μm, respectively, in Example 6.

It is clear from FIG. 4 that in either case of 0.73 μm and 0.43 μm, ferrite magnets containing La and Co had excellent magnetic properties, particularly improved iHc. Further, the ferrite magnet prepared by pulverizing ferrite powder to 0.43 μm and blending had improved Br of about 150G.

As a result of investigating the dependency of the magnetic properties on the average particle size of fine powder in detail, it has been found that when the average particle size exceeds 0.7 μm, the above production method loses its remarkable efficiency, and that when the average particle size is less than 0.4 μm, the unusual growth of crystal grains during the sintering rather deteriorates the magnetic properties of the ferrite magnet.

Also, as a result of investigating the dependency of the magnetic properties on the amount of the dispersant added at the time of blending in detail, it has been found that when the amount of the dispersant added is less than 0.2 weight % on a solid basis, remarkable effects cannot be obtained, and when it exceeds 2.0 weight %, the decomposition of the dispersant during the sintering rather deteriorates the magnetic properties of the ferrite magnet.

Example 7

$SrCO_3$ and $Fe_2O_3$ were formulated in such proportions as to provide the chemical formula: $SrO \cdot n(Fe_2O_3)$, wherein n=5.95, wet-mixed, and then calcined at 1200° C. for 2 hours in the air. Calcined powder was coarse-pulverized in a dry state by a roller mill and then wet-pulverized by an attritor to form a slurry containing fine powder having an average particle size of 0.8 μm. 0–5.0 weight % of $La_2O_3$ and 0–2.3 weight % of CaO, each based on the coarse powder, were added to the ferrite magnet powder at the early stage of pulverization. Also, 1.3 weight % of $Cr_2O_3$ was added at the early stage of pulverization to provide a comparative material. In either case, $SrCO_3$, $SiO_2$ and $CaCO_3$ were added as sintering aids in amounts of 0.5 weight %, 0.3 weight % and 0.8 weight % (0.45 weight % when converted to CaO), respectively, per the coarse powder.

When 2.50 weight % of $La_2O_3$ and 1.15 weight % of CaO were added, the final composition of the ferrite magnet approximately corresponded to the following formula:

$$(Sr_{1-x}La_x)O \cdot n[(Fe_{1-y}Co_y)_2O_3],$$

wherein x=0.15 and y=x/2n, and n=5.85.

The slurry containing fine powder having an average particle size of 0.8 μm was wet-molded in a magnetic field of 10 kOe, and the resultant green body was sintered in a temperature range of 1180–1230° C. for 2 hours. The resultant sintered body was worked to a shape of about 10 mm×10 mm×20 mm to measure magnetic properties thereof by a B-H tracer. The results are shown in FIG. 5.

Figure 5:
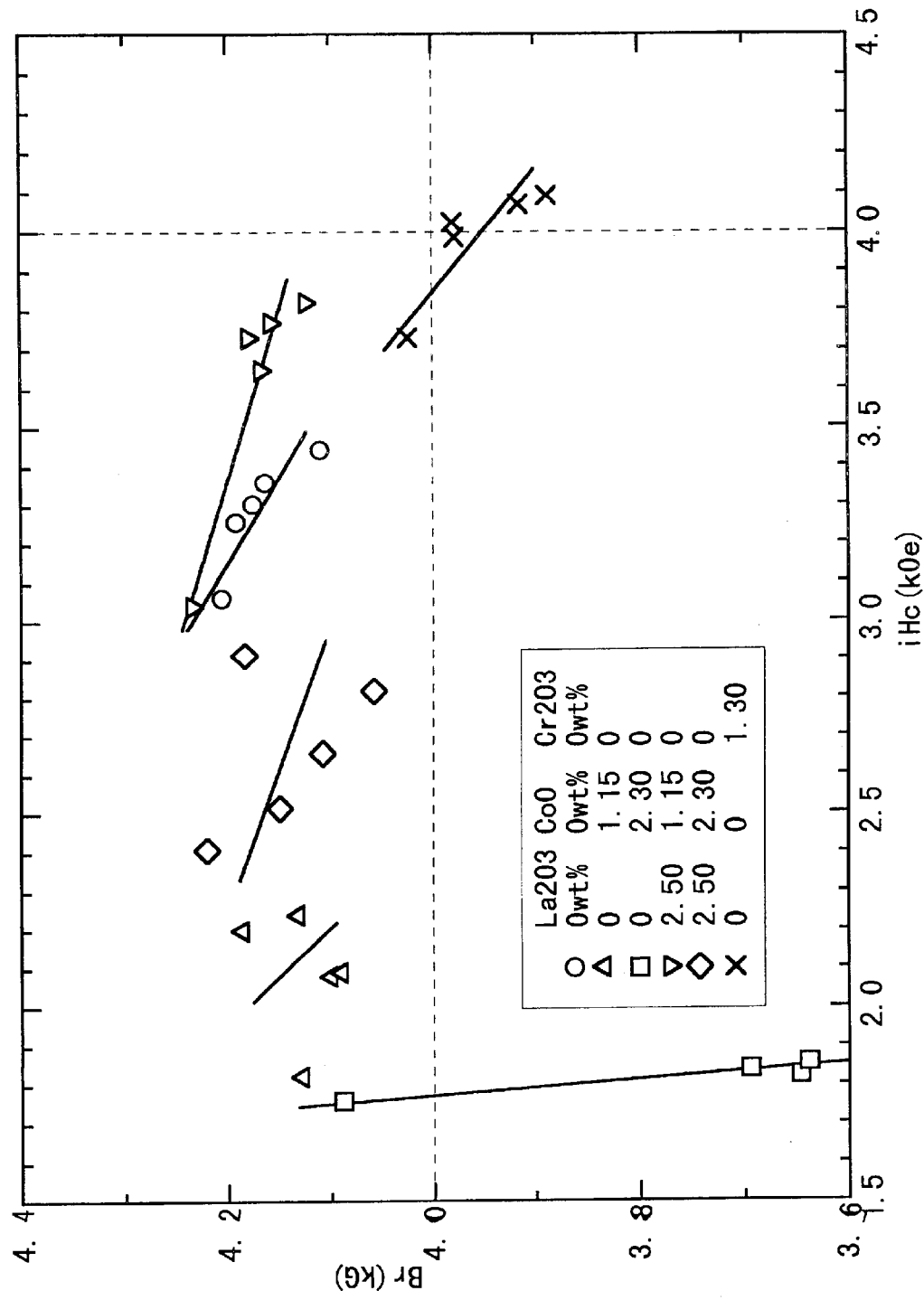
FIG. 5 is a graph showing the relations between the presence of $La_2O_3$, CoO and $Cr_2O_3$ and residual magnetic flux density Br and coercive force iHc in Example 7.

It has been found from FIG. 5 that when 2.50 weight % of $La_2O_3$ and 1.15 weight % of CaO were added (shown by ▽ in the figure), iHc was remarkably improved as compared with the case of no addition (shown by ○ in the figure). In the above case, it has also been found that decrease in Br in a high-iHc region was extremely smaller than when $Cr_2O_3$ having the function of increasing iHc was added (shown by X in the figure). Further, when only CoO was added (shown by △ and □ in the figure), or when the balance of charge compensation was destroyed (shown by ◇ in the figure), it has been confirmed that useful magnetic properties cannot be obtained.

It is clear from this Example that in the case of R=La and M=Co, remarkable effects are obtained, and that even when the R element and the M element are added at the time of fine pulverization, substantially the same effects are obtained as when they are added at the time of calcination.

Though the R element and the M element are added to Sr ferrite in the above Examples, it should be noted that the same effects are obtained when the R element and the M element are added to Ba ferrite.

As described above in detail, the present invention provides ferrite magnets substantially having a magnetoplumbite structure, whose saturation magnetization and/or coercive force are remarkably improved. Therefore, the ferrite magnets of the present invention are excellent in cost performance, thus useful in wide varieties of magnet applications.

What is claimed is:

1. A ferrite magnet having a composition represented by the general formula (1):

$$(A_{1-x}R_x)O \cdot n[(Fe_{1-y}M_y)_2O_3] \tag{1},$$

wherein A is Sr and/or Ba, R is at least one element selected from the group consisting of La, Nd, Pr, Sm, Eu and Gd, La being indispensable, M is at least one element selected from the group consisting of Mn, Co and Ni, and x, y and n meet $0.05 \leq x \leq 0.5$, $x/(2.4n) \leq y \leq x/(1.6n)$ and $5.4 \leq n \leq 6.0$, respectively.

2. The ferrite magnet according to claim 1, further containing 0.2–0.5 weight % of $SiO_2$ and 0.35–0.55 weight % of CaO based on 100 weight % of said composition represented by said general formula (1).

3. A ferrite magnet having a composition represented by the general formula (2):

$$(A_{1-x}R_x)O \cdot n[Fe_{1-y-z}M_yZn_z)_2O_3] \tag{2},$$

wherein A is Sr and/or Ba, R is at least one element selected from the group consisting of La, Nd, Pr, Sm, Eu and Gd, La being indispensable, M is at least one element selected from the group consisting of Mn, Co and Ni, Co being indispensable, and x, y, z and n meet $0.05 \leq x \leq 0.5$, $x/(2.4n) \leq (y+z) \leq x/(1.6n)$ and $5.4 \leq n \leq 6.0$, respectively, wherein Zn is indispensable in the composition represented by the general formula (2), and wherein the content of Co based on a total amount of M and Zn is at least 50 atomic percent.

4. The ferrite magnet according to claim 3, further containing 0.2–0.5 weight % of $SiO_2$ and 0.35–0.55 weight % of CaO based on 100 weight % of said composition represented by said general formula (2).

5. A method for producing a ferrite magnet having a composition represented by the general formula (1):

$$(A_{1-x}R_x)O \cdot n[(Fe_{1-y}M_y)_2O_3] \tag{1},$$

wherein A is Sr and/or Ba, R is at least one element selected from the group consisting of La, Nd, Pr, Sm, Eu and Gd, La being indispensable, M is at least one element selected from the group consisting of Mn, Co and Ni, and x, y and n meet $0.05 \leq x \leq 0.5$, $x/(2.4n) \leq y \leq x/(1.6n)$ and $5.4 \leq n \leq 6.0$, respectively, comprising the steps of preparing a starting material powder having said composition and an average particle size of 0.4–0.7 μm, and subjecting said starting material powder to molding in a magnetic field and then to sintering.

6. The method for producing a ferrite magnet according to claim 5, wherein 0.2–2.0 weight % (on a solid basis) of a dispersant is added to a slurry containing said starting material powder.

7. A method for producing a ferrite magnet having a composition represented by the general formula (2):

$$(A_{1-x}R_x)O \cdot n[Fe_{1-y-z}M_yZn_z)_2O_3] \tag{2},$$

wherein A is Sr and/or Ba, R is at least one element selected from the group consisting of La, Nd, Pr, Sm, Eu and Gd, La being indispensable, M is at least one element selected from the group consisting of Mn, Co and Ni, Co being indispensable, and x, y, z and n meet $0.05 \leq x \leq 0.5$, $x/(2.4n) \leq (y+z) \leq x/(1.6n)$ and $5.4 \leq n \leq 6.0$, respectively, wherein Zn is indispensable in the composition represented by the general formula (2), and wherein the content of Co based on a total amount of M and Zn is at least 50 atomic percent; comprising the steps of preparing a starting material powder having said composition and an average particle size of 0.4–0.7 μm; and subjecting said starting material powder to molding in a magnetic field and then to sintering.

8. The method for producing a ferrite magnet according to claim 7, wherein 0.2–2.0 weight % (on a solid basis) of a dispersant is added to a slurry containing said starting material powder.

9. The ferrite magnet according to claim 1, wherein Co is indispensable in M of said general formula (1).

10. The ferrite magnet according to claim 9, wherein the content of Co in M based on a total amount of M is at least 50 atomic percent.

* * * * *